United States Patent
Adams et al.

(10) Patent No.: US 6,282,171 B1
(45) Date of Patent: Aug. 28, 2001

(54) SYSTEM AND METHOD REGARDING EARLY PACKET DISCARD (EPD) AND PARTIAL PACKET DISCARD (PPD)

(75) Inventors: Jay Adams, Grove City; John E. Drake, Jr., Pittsburgh, both of PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 08/996,828

(22) Filed: Dec. 23, 1997

(51) Int. Cl.[7] .................................................. H04L 12/56
(52) U.S. Cl. ............................................. 370/229; 370/397
(58) Field of Search ..................................... 370/229–231, 370/235–236, 394–395, 474, 412, 397

(56) References Cited

U.S. PATENT DOCUMENTS

| | | | |
|---|---|---|---|
| 5,689,499 | * 11/1997 | Hullett et al. | 370/235 |
| 5,764,641 | * 6/1998 | Lin | 370/412 |
| 6,032,272 | * 2/2000 | Soirinsuo et al. | 370/236 |

* cited by examiner

Primary Examiner—Wellington Chin
Assistant Examiner—Maikhanh Tran
(74) Attorney, Agent, or Firm—Ansel M. Schwartz

(57) ABSTRACT

The present invention pertains to a system for sending ATM cells. The system comprises an ATM network along which ATM cells travel. The system comprises source nodes connected to the ATM network which produce packets having cells and transmit the cells on the ATM network. The system comprises I input switches connected to the ATM network, where I is greater than or equal to 1 and is an integer, which receive cells from the ATM network transmitted by the source node. The system comprises M intermediate switches connected to the ATM network, where M is greater than or equal to 1, which receive signals from the ATM network transmitted by at least one input switch. The intermediate switch discards cells only of a same packet when a predetermined event occurs so the discarded cells are not transmitted by the intermediate switch. The system comprises destination nodes connected to the ATM network which receive non-discarded ATM cells from the intermediate switch. The present invention pertains to a method for sending ATM cells. The method comprises the steps of receiving cells of ATM packets at an intermediate switch from an ATM network that have been transmitted by an input switch. Next there is the step of discarding only cells of the same ATM packet from the intermediate switch. Then there is the step of receiving non-discarded cells at a destination node from the ATM network that have been transmitted from the intermediate switch.

10 Claims, 3 Drawing Sheets

SYSTEM AND METHOD REGARDING EARLY PACKET DISCARD (EPD) AND PARTIAL PACKET DISCARD (PPD)

FIELD OF THE INVENTION

The present invention is related to managing the transmission of ATM packets. More specifically, the present invention is related to managing the transmission of ATM packets by discarding cells only of a same packet when a predetermined event occurs.

BACKGROUND OF THE INVENTION

Early Packet Discard (EPD) and Partial Packet Discard (PPD) when used in conjunction with per VC queuing have proved to be an extremely effective method for providing congestion control in an ATM network while maximizing users' goodput. In order to provide for congestion control, an ATM switch will begin to discard cells when its cell buffers begin to fill past configured thresholds. Without EPD/PPD, an ATM switch might discard N cells with each cell belonging to a different user packet; this means it has effectively discarded N user packets, all of which will have to be retransmitted. With EPD/PPD, an ATM switch will only discard cells that belong to the same packets; i.e., the unit of discard is packets rather than cells. This minimizes the number of user packets that are discarded.

Unfortunately, the EPD/PPD only works for AAL5, since it uses the End of Message (EOM) bit in the ATM header. This means that in order to perform EPD/PPD, an ATM switch must have awareness of individual VCs so that it knows which VCs are using AAL5. This can cause scaling problems for ATM switches in the core of a large ATM network, because they will tremendous numbers of VCs transiting them. In addition to having to maintain state for a large number of VCs, these core ATM switches will have to process the signaling messages for all of these VCs, which puts a large burden on the processors in these switches.

Ideally, these core switches would have only VP awareness, so that they wouldn't have to maintain per VC state or process per VC signaling messages, while at the same time be capable of performing EPD/PPD. The present invention solves this problem.

SUMMARY OF THE INVENTION

The present invention pertains to a system for sending ATM cells. The system comprises an ATM network along which ATM cells travel. The system comprises source nodes connected to the ATM network which produce packets having cells and transmit the cells on the ATM network. The system comprises I input switches connected to the ATM network, where I is greater than or equal to 1 and is an integer, which receive cells from the ATM network transmitted by the source node. The system comprises M intermediate switches connected to the ATM network, where M is greater than or equal to 1, which receive signals from the ATM network transmitted by at least one input switch. The intermediate switch discards cells only of a same packet when a predetermined event occurs so the discarded cells are not transmitted by the intermediate switch. The system comprises destination nodes connected to the ATM network which receive non-discarded ATM cells from the intermediate switch.

The present invention pertains to a method for sending ATM cells. The method comprises the steps of receiving cells of ATM packets at an intermediate switch from an ATM network that have been transmitted by an input switch. Next there is the step of discarding only cells of the same ATM packet from the intermediate switch. Then there is the step of receiving non-discarded cells at a destination node from the ATM network that have been transmitted from the intermediate switch.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
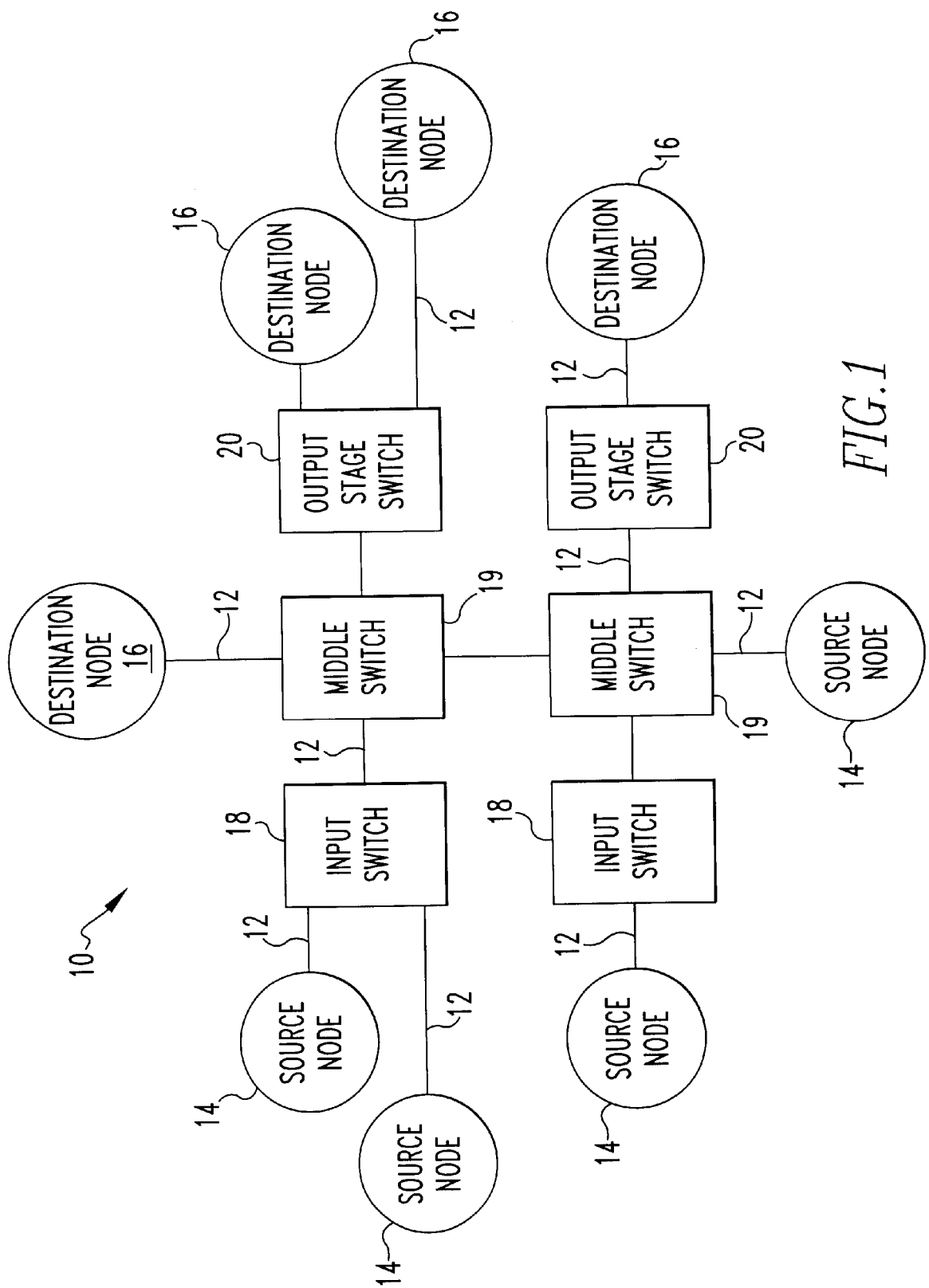
FIG. 1 is a schematic representation of a system of the present invention.

Referring now to the drawings wherein like reference numerals refer to similar or identical parts throughout the several views, and more specifically to FIG. 1 thereof, there is shown a system 10 for sending ATM cells 15. The system 10 comprises an ATM network 12 along which ATM cells 15 travel. The system 10 comprises source nodes 14 connected to the ATM network 12 which produce packets 11 having cells 15 and transmit the cells 15 on the ATM network 12. The system 10 comprises I input switches 18 connected to the ATM network 12, where I is greater than or equal to 1 and is an integer, which receive cells 15 from the ATM network 12 transmitted by the source node 14. The system 10 comprises M intermediate switches 19 connected to the ATM network 12, where M is greater than or equal to 1, which receive signals from the ATM network 12 transmitted by at least one input switch 18. The intermediate switch 19 discards cells 15 only of a same packet 11 when a predetermined event occurs so the discarded cells 15 are not transmitted by the intermediate switch 19. The system 10 comprises destination nodes 16 connected to the ATM network 12 which receive non-discarded ATM cells 15 from the intermediate switch 19.

The system 10 preferably includes O output stage switches 20 connected to the ATM network 12, where O is greater than or equal to 1 and is an integer, which receive ATM cells 15 from the ATM network 12 transmitted by the intermediate switch 19 and which transmits cells 15 to the ATM network 12 to be sent to a destination node 16.

Figure 2:
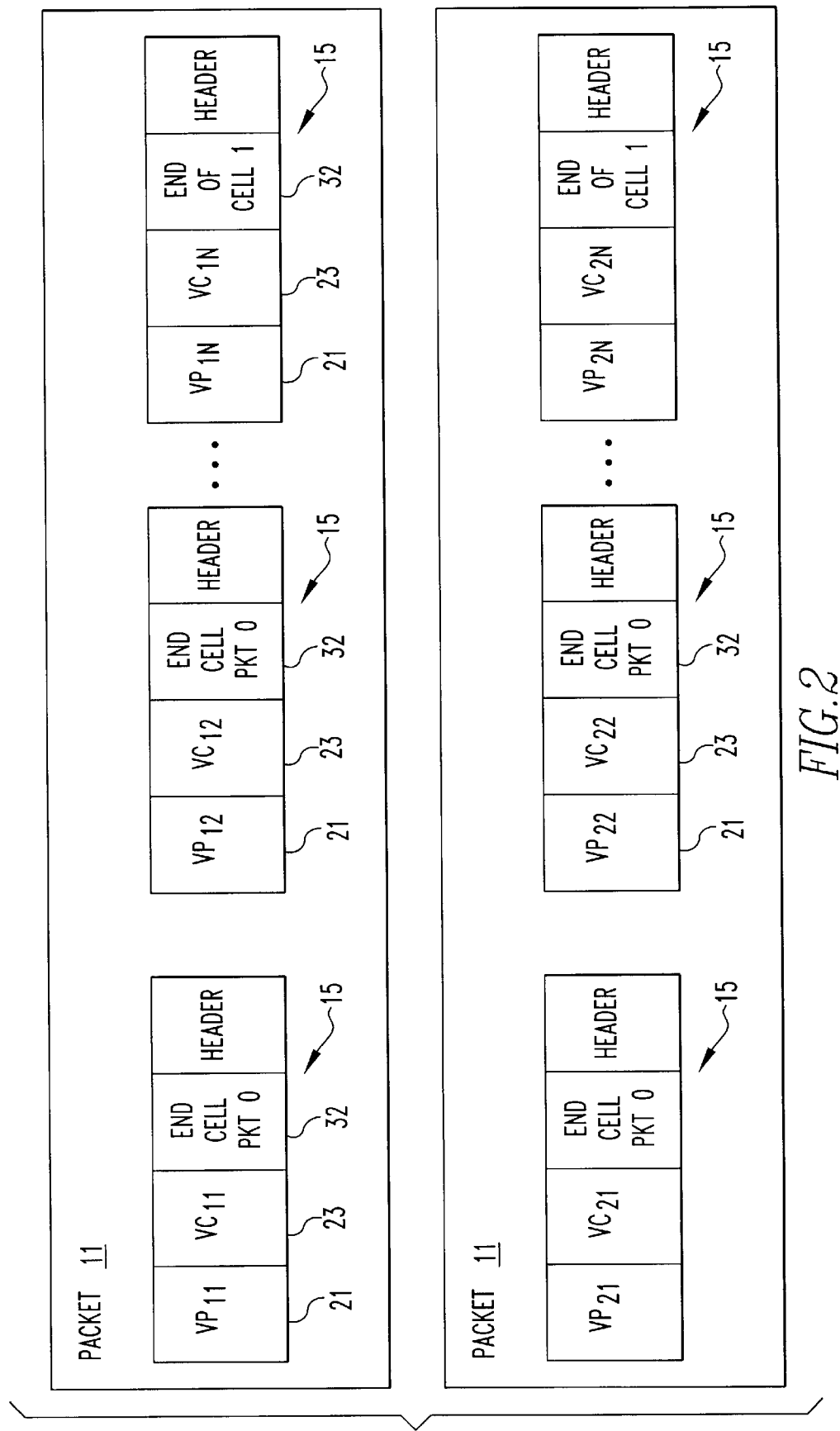
FIG. 2 is a schematic representation of packets with cells.
Figure 3:
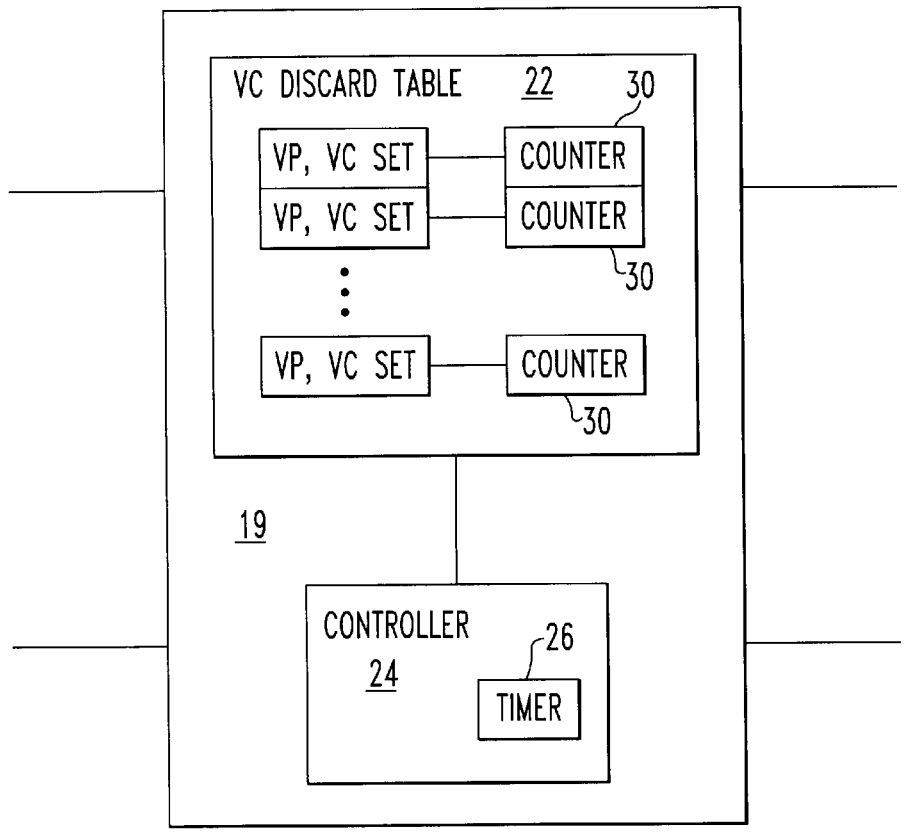
FIG. 3 is a schematic representation of an intermediate switch of the present invention.

Each cell 15 of each packet 11 preferably has a unique VP 21 and VC 23, as shown in FIG. 2, and the intermediate switch 19 includes a VC discard table 22 which supports a VP and VC set 28 of each packet 11 which is to be discarded, as shown in FIG. 3. Preferably, the VC discard table 22 includes a discard counter 30 associated with each VP and VC set 28 which counts how many cells 15 have been discarded by the intermediate switch 19 with the associated VP and VC set 28. The VC discard table 22 can be a local memory, such as a RAM, for each VP and VC set 28 (connection) or preferably a single larger memory, such as a RAM, which holds all VP and VC sets 28 or connections.

Preferably, the intermediate switch 19 has a controller 24 which reviews the VP 21 and VC 23 of each cell 15 which the intermediate switch 19 receives with each VP and VC set 28 in the VC discard table 22 and discards the cell 15 if its VP 21 and VC 23 match any VP and VC set 28 in the VC discard table 22, said controller 24 connected to the VC discard table 22. The controller 24 of the intermediate switch 19 preferably reviews each cell 15 it receives for an end of packet identifier 32 which indicates the cell 15 is an end of packet cell 15 if the identifier 32 is present, and stores in the VC discard table 22 the VP 21 and VC 23 of a next cell 15 following the end of packet cell 15 as a VP and VC set 28 and discards the next cell 15.

The controller 24 preferably only discards a predetermined number of cells 15 having a VP 21 and VC 23 corresponding to a VP and VC set 28 in the VC discard table 22. Preferably, the predetermined number of cells 15 is no greater than the number of cells 15 in a packet 11. Alternatively, the controller 24 can discard a predetermined number of packets 11 having a VP 21 and VC 23 corresponding to a VP and VC set 28 in the VC discard table 22.

The controller 24 preferably stops discarding cells 15 having a VP 21 and VC 23 corresponding to a VP and VC set 28 in the VC discard table 22 before the predetermined number of cells 15 are discarded if an end of packet cell 15 of the packet 11 associated with the VP and VC set 28 in the VC discard table 22 is identified by the controller 24. Preferably, the VC discard table 22 maintains a timer 26 associated with each VP and VC set 28, and the controller 24 discards the VP and VC set 28 if no cell 15 is received by the intermediate switch 19 having the corresponding VP and VC set 28 after a predetermined time.

A predetermined event is preferably when the controller 24 determines that congestion of the intermediate switches 19 is occurring. Each VP and VC set 28 of a packet 11 which the intermediate switch preferably receives has a threshold for cells 15 which are received by the intermediate switch, and when a threshold is exceeded, the controller 24 causes cells 15 having the VP 21 and VC 23 of the VP and VC set 28 to be discarded. The threshold can define congestion for each VP and VC set 28.

Preferably, the source node 14 produces packets 11 having cells 15 with the end of packet identifier 32 and packets 11 having cells 15 without an end of packet identifier 32. The controller 24 then determines congestion of the intermediate switch by determining how many cells 15 total of cells 15 with and cells 15 without end of packet identifiers 32 are arriving at the intermediate switch, and the controller 24 causes cells 15 to be discarded having a VP and VC set 28 in the VC discard table 22 when congestion of the intermediate switch occurs. Preferably, packets 11 having cells 15 with an end of packet identifier 32 are AAL5 packets 11 and packets 11 having cells 15 without an end of packet identifier 32 are either AAL1, AAL2, AAL3 or AAL4 packets 11

Figure 4:
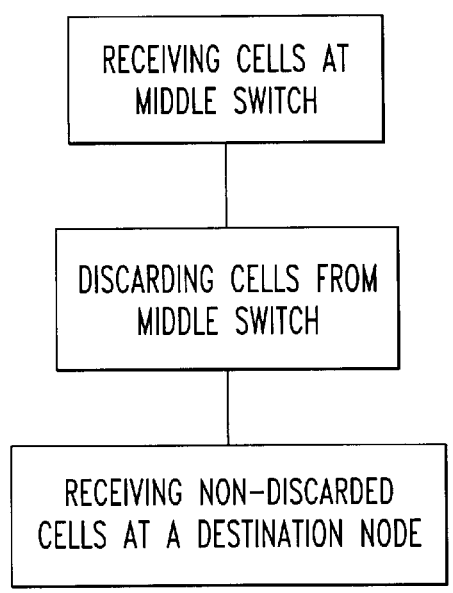
FIG. 4 is a flow chart of the method of the present invention.

The present invention pertains to a method for sending ATM cells 15, as shown in FIG. 4. The method comprises the steps of receiving cells 15 of ATM packets 11 at an intermediate switch from an ATM network 12 that have been transmitted by an input switch 18. Next there is the step of discarding only cells 15 of the same ATM packet 11 from the intermediate switch. Then there is the step of receiving non-discarded cells 15 at a destination node 16 from the ATM network 12 that have been transmitted from the intermediate switch.

Preferably, after the receiving step there are the steps of a predetermined event occurring. Next there is the step of placing a VP and VC set 28 into a VC discard table 22 associated with the VP 21 and VC 23 of cells 15 to be discarded. The discarding step then preferably includes the step of discarding cells 15 having the VP 21 and VC 23 of the VP and VC set 28 in the VC discard table 22. Preferably, the discarding step includes the step of discarding a predetermined number of cells 15 whose VP 21 and VC 23 correspond to the VP and VC set 28 in the VC discard table 22. The discarding step alternatively includes the step of discarding a predetermined number of packets 11 whose VP 21 and VC 23 correspond to the VP and VC set 28 in the VC discard table 22.

After the predetermined event occurring step, there are preferably the steps of identifying an end of packet cell 15 received by the intermediate switch, and choosing the VP 21 and VC 23 of the next cell 15 received by the intermediate switch to be placed in the VC discard table 22. Preferably, the predetermined event step includes the step of identifying congestion at the intermediate switch.

The receiving cells 15 of ATM packets 11 step preferably includes the steps of receiving cells 15 having an end of packet identifier 32 and receiving cells 15 not having an end of packet identifier 32. Then the step of identifying congestion at the intermediate switch includes the step of determining the total number of cells 15 received at a given time at the switch.

In the operation of the preferred embodiment, source nodes 14 connected to an ATM network 12 produce packets 11 that are to ultimately be received by destination nodes 16 also connected to the ATM network 12. Each packet 11 is comprised of cells 15 with each cell 15 of a packet 11 having the same VP 21 and VC 23 in its header to aid in the cell 15 of the packet 11 ultimately arriving at a desired destination node 16. The packets 11 produced by the source nodes 14 are first received by an input switch 18 on the ATM network 12 which is connected through the ATM network 12 to the source nodes 14. As the input switch 18 receives packets 11 from the source nodes 14, the cells 15 of the packet 11 are typically not maintained together, but are intermingled with other cells 15 of other packets 11 from other source nodes 14 by the input switch 18 in preparation of transmitting the cells 15 of the ATM network 12 toward their ultimate destination node 16.

Connected to the ATM network 12 are intermediate switches 19 that receive cells 15 of packets 11 from the input switches 18. An intermediate switch can also receive cells 15 of packets 11 from source nodes 14 directly through the ATM network 12 without the cells 15 first passing through an input switch 18. An input switch 18 only receives cells 15 on the ATM network 12 which have directly come from source nodes 14 and are to be transmitted on to either intermediate switches 19 or destination nodes 16. An input switch 18 can also receive cells 15 from an intermediate switch but such cells 15 only are then transmitted directly to source nodes 14 through the ATM network 12 and not on to another switch. In an intermediate switch, there is at least one packet 11 of cells 15 that is being received from the ATM network 12 after having just passed through an input switch 18 rather than directly from a source node 14. The intermediate switch can also receive cells 15 from the ATM network 12 that have been transmitted by source nodes 14.

As more and more cells 15 arrive at an intermediate switch, the capacity of the intermediate switch becomes exhausted. A controller 24 in the intermediate switch keeps track of the demands placed on the resources of the intermediate switch and at a predetermined threshold, the controller 24 determines that there is congestion at the intermediate switch due to the quantity of cells 15 that are placing demands on the intermediate switch. Once congestion is identified by the controller 24, the VP 21 and VC 23 of each cell 15 being received by the intermediate switch is reviewed. The controller 24 searches for the first cell 15 that it receives which has an end of packet identifier 32. The presence of an end of packet identifier 32 in the cell 15 indicates that it is the last cell 15 of a packet 11 passing through the intermediate switch.

Once the end of packet identifier 32 is found by the controller 24, the controller 24 then take the VP 21 and VC 23 of the very next cell 15 the intermediate switch receives and places the VP 21 and VC 23 of this very next cell 15 into a VC discard table 22. The controller 24 also discards this very next cell 15 of the intermediate switch so that it will not be transmitted along the ATM network 12 to its next destination toward its ultimate destination. By discarding the cell 15, it relieves some of the demand on the intermediate switch's resources so that the intermediate switch can properly process the cells 15 it is receiving and not discarding.

The controller 24 will also record that an end of packet was received, indicating that the next cell matching the VPI/VCI is the first cell of the next packet. If the congested state has been corrected before the first cell of the next packet arrives from the entry is purged from the table and the next cell is not discarded.

The controller 24 reviews each cell 15 that is received by the intermediate switch to determine if the VP 21 and VC 23 of a cell 15 received by the intermediate switch corresponds with a VP and VC set 28 in the VC discard table 22. If the cell 15 received by the intermediate switch has a VP 21 and VC 23 which corresponds to a VP and VC set 28 in the VC discard table 22 and the controller 24 causes this cell 15 to be discarded.

The controller 24 keeps track of each cell 15 having a specific VP 21 and VC 23 that corresponds with a VP and VC set 28 in the VC discard table 22 that it discards in a discard counter 30 associated with each VP and VC set 28. The controller 24 continues to discard all cells 15 that are received by the intermediate switch which have the VP 21 and VC 23 corresponding to the VP and VC set 28 in the VC discard table 22 until a cell 15 with the VP 21 and VC 23 corresponding to the VP and VC set 28 in the VC discard table 22 is received which has an end of packet identifier 32. The controller 24 then causes the VP and VC set 28 in the VC discard table 22 to be eliminated from the VC discard table 22 so no further cells 15 having a VP 21 and VC 23 that correspond with the VP and VC set 28 which is being eliminated will be discarded.

Alternatively, if a predetermined number of cells 15 having the VP 21 and VC 23 corresponding with the VP and VC set 28 in the VC discard table 22 are discarded from the intermediate switch by the controller 24, as noted by the discard counter 30 for the VC and VP set, the controller 24 will then also cause the VP and VC set 28 to be eliminated from the VC discard table 22. Typically the counter is set to indicate a threshold equal to the number of cells 15 in a packet 11 to ensure that all the cells 15 of the packet 11 having a VP 21 and VC 23 corresponding to a VP and VC set 28 in the VC discard table 22 are discarded. This insures that if a cell 15 having the end of packet identifier 32 for a VP 21 and VC 23 which corresponds to a VP and VC set 28 in the VC discard table 22 is somehow lost before it is received by the intermediate switch, the controller 24 will not continue indefinitely to discard cells 15 having a VP 21 and VC 23 corresponding to the VP and VC set 28 in the VC discard table 22.

Instead of the controller 24 eliminating the VP and VC set 28 after a predetermined number of cells 15 with a VP 21 and VC 23 corresponding to the VP and VC set 28 are received, a predetermined number of packets 11 can be received and discarded with the corresponding VP 21 and VC 23 to the VP and VC set 28 in the VC discard table 22. This could further ensure that continuity is maintained with the packets 11 that are received and there are no packets 11 with missing cells 15, by making sure enough packets 11 are received and discarded that transmission of such packets 11 occurs only after whole packets 11 are eliminated. This also serves to reduce the congestion on the intermediate switch for a greater period of time in regard to the associated VP 21 and VC 23 of the VP and VC set 28.

To avoid stagnant VP and VC sets 28 in the VC discard table 22, the controller 24 will eliminate a VP and VC set 28 from the VC discard table 22 after a predetermined time has passed from when the intermediate switch has received a cell 15 with a corresponding VP 21 and VC 23. In this way, if the intermediate switch never receives another cell 15 with a VP 21 and VC 23 corresponding to a VP and VC set 28 in the VC discard table 22, the VP and VC set 28 will not remain in the VC discard table 22 indefinitely.

The thresholds that are set do not necessarily need to be based only on actual congestion concerns. Thresholds can artificially be set for each connection to establish weighting features in the intermediate switch. If it is desired to provide each VP 21 and VC 23 with a corresponding amount of service from the intermediate switch, where such service may be the same or different from other VP 21 and VC 23 connections, then the threshold can be set for each connection that is higher or lower depending on the desired service to be provided to the connection, which indicates that congestion has occurred. Once the threshold is met, then for the connection the threshold is met, the intermediate switch will discard corresponding cells 15 with the VP 21 and VC 23 in the VP and VC set 28 in the VC discard table 22 as described above. Thus, if one connection having a corresponding VP 21 and VC 23 is desired to be given more service then a different connection having a corresponding VP 21 and VC 23, then the first connection will be assigned a threshold higher than the threshold assigned the other connection.

By reviewing the VP 21 and VC 23 of each cell 15 received by an intermediate switch and eliminating desired cells 15 with a VP 21 and VC 23 corresponding to a VP and VC set 28 in the VC discard table 22, efficiency of the overall network 12 is increased and disruption and redundancy is decreased. Instead of arbitrarily eliminating cells 15 from different packets 11 which would then cause the number of packets 11 to be lost equal to the number of different cells 15 having a different VP and VC which are eliminated, with the technique described herein only desired packets 11 are eliminated for a given period of time and the effect of the discard of the packets 11 is controlled and the operation of the system 10 can be better defined.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for sending ATM cells comprising:
an ATM network along which ATM cells travel;
source nodes connected to the ATM network which produce packets having cells and transmit the cells on the ATM network;

I input switches connected to the ATM network, where I is greater than or equal to 1 and is an integer, which receive cells transmitted by the source nodes;

M intermediate switches connected to the ATM network, where M is greater than or equal to 1, which receive signals from the ATM network transmitted by at least one input switch, said intermediate switch discarding cells only of a same packet when a predetermined event occurs, each intermediate switch reviews each cell of a packet it receives for an end-of-packet identifier which indicates the cell is an end of packet cell if the identifier is present, and stores in a memory the VP and VC of a next cell following the end of packet cell as a VP and VC set and discards the next cell after the predetermined event occurs but does not discard cells of a packet received by the intermediate switch before the end of packet cell is received after the predetermined event occurs, each cell of each packet has a unique VP and VC and the intermediate switch includes a VC discard table which supports a VP and VC set of each packet which is to be discarded, the intermediate switch has a controller which reviews the VP and VC of each cell which the intermediate switch receives with each VP and VC set in the VC discard table and discards the cell if its VP and VC match any VP and VC set in the VC discard table, said controller connected to the VC discard table, the controller of the intermediate switch reviews each cell it receives for an end-of-packet identifier which indicates the cell is an end of packet cell if the identifier is present, and stores in a memory the VP and VC of a next cell following the end of packet cell as a VP and VC set and discards the next cell, the VC discard table includes a discard counter associated with each VP and VC set which counts how many cells have been discarded by the intermediate switch with the associated VP and VC set;

destination nodes connected to the ATM network which receives non-discarded ATM cells from the intermediate switch; and O output stage switches connected to the ATM network, where O is greater than or equal to 1 and is an integer, which receive ATM cells from the ATM network transmitted by the intermediate switch and which transmits cells to the ATM network to be sent to a destination node.

2. A system as described in claim 1 wherein the controller only discards a predetermined number of cells having a VP and VC corresponding to a VP and VC set in the VC discard table.

3. A system as described in claim 2 wherein the predetermined number of cells is no greater than the number of cells in a packet.

4. A system as described in claim 3 wherein the controller stops discarding cells having a VP and VC corresponding to a VP and VC set in the VC discard table before the predetermined number of cells are discarded if an end of packet cell of the packet associated with the VP and VC set in the VC discard table is identified by the controller.

5. A system as described in claim 4 wherein the VC discard table maintains a timer associated with each VP and VC set, and the controller discard s the VP and VC set if no cell is received by the intermediate switch having the corresponding VP and VC set after a predetermined time.

6. A system as described in claim 5 wherein a predetermined event is when the controller determines that congestion of the intermediate switches is occurring.

7. A system as described in claim 6 wherein the source node produces packets having cells with the end of packet identifier and packets having cells without an end-of-packet identifier, and wherein the controller determines congestion of the intermediate switch by determining how many cells total of cells with and cells without end of packet identifiers are arriving at the intermediate switch, and the controller causes cells to be discarded having a VP and VC set in the VC discard table when congestion of the intermediate switch occurs.

8. A system as described in claim 7 wherein each VP and VC set of a packet which the intermediate switch receives has a threshold for cells which are received by the intermediate switch, and when a threshold is exceeded, the controller causes cells having the VP and VC of the VP and VC set to be discarded.

9. A system as described in claim 8 wherein packets having cells with an end of packet identifier are AAL5 packets and packets having cells without an end of packet identifier are either AAL1, AAL2, AAL3 or AAL4 packets.

10. A method for sending ATM cells comprising the steps of:

receiving cells having an end of packet identifier and receiving cells not having an end-of-packet identifier of ATM packets at an intermediate switch from an ATM network that have been transmitted by an input switch;

determining the total number of cells received at a given time at the switch;

determining congestion has occurred at the intermediate switch;

receiving a cell of an ATM packet after congestion has occurred which packet already had cells stored in the intermediate switch;

storing the cell in the intermediate switch;

identifying an end-of-packet cell of the ATM packet received by the intermediate switch after congestion occurs;

choosing a VP and VC of the next cell received by the intermediate switch to be placed in a VC discard table;

placing the VP and VC as a VP and VC set into the VC discard table associated with the VP and VC of cells to be discarded; discarding cells having the VP and VC of the VP and VC set in the VC discard table;

discarding a predetermined number of ATM packets whose VP and VC correspond to the VP and VC set in the VC discard table from the intermediate switch and counting with a discard counter associated with each VP and VC set how many cells have been discarded by the intermediate switch with the associated VP and VC set; and receiving non-discarded cells at a destination node from the ATM network that have been transmitted from the intermediate switch.

* * * * *